(12) United States Patent
Tranchant et al.

(10) Patent No.: US 8,381,115 B2
(45) Date of Patent: *Feb. 19, 2013

(54) METHOD OF MANAGING CHARACTER FONTS WITHIN MULTIMEDIA SCENES, AND THE CORRESPONDING COMPUTER PROGRAM AND TERMINAL

(75) Inventors: Julien Tranchant, Rennes (FR); Cédric Gegout, Rennes (FR); Nicolas Pierre, Marpire (FR)

(73) Assignee: Streamezzo, Paris (FR)

( * ) Notice: Subject to any disclaimer, the term of this patent is extended or adjusted under 35 U.S.C. 154(b) by 658 days.

This patent is subject to a terminal disclaimer.

(21) Appl. No.: 12/092,483

(22) PCT Filed: Oct. 31, 2006

(86) PCT No.: PCT/EP2006/068003
§ 371 (c)(1),
(2), (4) Date: Sep. 18, 2008

(87) PCT Pub. No.: WO2007/051808
PCT Pub. Date: May 10, 2007

(65) Prior Publication Data
US 2009/0031220 A1    Jan. 29, 2009

(30) Foreign Application Priority Data

Nov. 2, 2005 (FR) .................................. 05 11178

(51) Int. Cl.
*G06F 3/048* (2006.01)
*G06F 21/00* (2006.01)

(52) U.S. Cl. ............. 715/764; 705/50; 705/51; 715/269
(58) Field of Classification Search ............... 715/719, 715/269; 345/471; 707/912; 705/50–51
See application file for complete search history.

(56) References Cited

U.S. PATENT DOCUMENTS
(Continued)

FOREIGN PATENT DOCUMENTS
EP        0 199 396          9/1984
EP        0119396 A2        9/1984
(Continued)

OTHER PUBLICATIONS

Virtual Reality Modeling Language, International Standard ISO/IEC 14772-1:1997.*

(Continued)

*Primary Examiner* — Tuyetlien Tran
*Assistant Examiner* — Amy M Levy
(74) *Attorney, Agent, or Firm* — Zilka-Kotab, PC (57) ABSTRACT

A method is provided for managing fonts in a radio communication terminal, which can receive fonts in order to render contents on a screen. One such method involves the use of the following elements in the terminal, namely: a font database that lists all of the fonts or font portions stored by the terminal and matches at least one management parameter with each of the fonts; and set of font management commands including at least one command, which is applied to a font portion and which belongs to the group containing at least a command for transmitting a font portion for storage in the terminal, a command for updating a font portion stored in the terminal and a command for deleting a font portion stored in the terminal.

9 Claims, 1 Drawing Sheet

U.S. PATENT DOCUMENTS

| | | | | |
|---|---|---|---|---|
| 5,586,242 | A  * | 12/1996 | McQueen et al. | 345/467 |
| 6,526,575 | B1 * | 2/2003 | McCoy et al. | 725/36 |
| 6,853,980 | B1 * | 2/2005 | Ying et al. | 705/26.62 |
| 7,346,845 | B2 * | 3/2008 | Teshima | 715/269 |
| 7,639,257 | B2 * | 12/2009 | Renner | 345/467 |
| 7,813,822 | B1 * | 10/2010 | Hoffberg | 700/94 |
| 2005/0080839 | A1 | 4/2005 | Kuwata et al. | 709/200 |
| 2006/0253395 | A1 * | 11/2006 | Corbell | 705/50 |
| 2007/0008309 | A1 * | 1/2007 | Sahuc et al. | 345/418 |
| 2007/0024626 | A1 * | 2/2007 | Kagle et al. | 345/467 |
| 2008/0046817 | A1 * | 2/2008 | Sharp et al. | 715/700 |
| 2008/0235578 | A1 * | 9/2008 | Heed et al. | 715/269 |
| 2009/0100074 | A1 * | 4/2009 | Joung et al. | 707/100 |
| 2009/0307585 | A1 | 12/2009 | Tranchant et al. | |

FOREIGN PATENT DOCUMENTS

| | | |
|---|---|---|
| EP | 1069549 A1 | 1/2001 |

OTHER PUBLICATIONS

Koenen, Rob. Overview of MPEG-4 Standard—International Organisation for Standardisation ISO/IEC JTC1/SC29/WG11Coding of Moving Pictures and Audio, Mar. 2002, retrieved from http://mpeg.chiariglione.org/standards/mpeg-4/mpeg-4.htm on Jun. 20, 2011.*

Marian. Caching Implies Policy. Jan. 19, 2004, retrieved from http://blogs.msdn.com/b/ricom/archive/2004/01/19/60280.aspx on Apr. 26, 2012.*

"Technologies de l'information—Codage des objets audiovisuels. Partie 17: Format texte en flux," Apr. 4, 2006. XP009070985.

"Technologies de l'information—Codage des objets audiovisuels. Partie 18: Compression et transmission de policies de caracteres," Jul. 1, 2007, XP009070984.

Written Opinion from counterpart foreign Application No. PCT/EP2006/068003.

International Search Report from International Application No. PCT/EP2006/068003, dated Jan. 26, 2007.

Final Office Action from U.S. Appl. No. 12/092,472 dated Jul. 5, 2011.

Advisory Action from U.S. Appl. No. 12/092,472 dated Sep. 16, 2011.

Non-Final Office Action from U.S. Appl. No. 12/092,472 dated Jan. 25, 2011.

Office Action from Chinese Patent Application No. 200680040875.8 dated Oct. 30, 2009.

Office Action from Chinese Patent Application No. 200680048797.6 dated Feb. 12, 2010.

International Search Report and Written Opinion from International Application No. PCT/EP2006/068002 dated Jan. 26, 2007.

Examination Report from European Application No. 06829924.7 dated Oct. 17, 2008.

Non-Final Office Action from U.S. Appl. No. 12/092,472 dated Jun. 14, 2012.

Notice of Allowance from U.S. Appl. No. 12/092,472 dated Nov. 9, 2012.

* cited by examiner

METHOD OF MANAGING CHARACTER FONTS WITHIN MULTIMEDIA SCENES, AND THE CORRESPONDING COMPUTER PROGRAM AND TERMINAL

CROSS-REFERENCE TO RELATED APPLICATIONS

This Application is a Section 371 National Stage Application of International Application No. PCT/EP2006/068003, filed Oct. 31, 2006 and published as WO 2007/051808 on May 10, 2007, not in English.

FIELD OF THE DISCLOSURE

The field of the disclosure is that of applications, in particular embedded in radio communication terminals, for example of the type radio telephone, PDA (Personal Digital Assistant), laptop computer, etc., which require a representation of the signals that make it up, for example in the form of one or more multimedia scenes, formed by a spatio-temporal arrangement of graphical objects.

More precisely, the disclosure concerns the optimized and dynamic management of character fonts within such terminals, for optimum rendering of the graphical and multimedia scenes transmitted by a content server terminal, on client terminals that requested them, when textual objects are used or called in the latter.

BACKGROUND OF THE DISCLOSURE

Among the known solutions of the prior art, several character font representation formats have been developed.

None of these formats however propose an information management mechanism concerning the character fonts that have been previously selected by the designer or author of a graphical representation, for example a multimedia scene, in order to write text in the latter (a logo, mark, slogan etc. for example).

Among the most successful formats, more particularly dedicated to continuous loading (or "streaming") of character fonts, parts 17 and 18 of the MPEG-4 standard (ISO/IEC 14496-17—"Information technology—Coding of audio-visual objects—Part 17 and ISO/IEC 14496-18—"Information technology—Coding of audio visual objects—Part 18) describe the mechanisms for enhancing character fonts and associating a content with a particular font in order to render text objects in an MPEG-4 scene, compressing and streaming character fonts of the "OpenType" type for transmission to a client terminal.

However, in the MPEG-4 standard, the management of character fonts takes place independently of the receiving terminal that is to render the MPEG-4 multimedia scene. The character font or fonts defined in the scene to be rendered are systematically transmitted to the receiving terminal, by a content or graphical scene server terminal, without any consideration as to knowing whether this receiving terminal has the capacity to receive and render the character font transmitted within the corresponding graphical scene (limited memory space for example).

Such an approach to the management of character fonts in the meaning of parts 17 and 18 of the MPEG-4 standard therefore does not enable a receiving terminal to effectively manage a set of fonts, nor even to characterize the latter by means of temporal properties, duration properties or characteristics relating to the multimedia contents to be rendered.

Conventionally therefore, the only techniques that make it possible to manage information relating to the character fonts previously defined for use in a graphical scene use basic permanent storage methods.

They suffer from a lack of flexibility usually resulting in the impossibility of downloading pieces of character fonts when all or some of the fonts stored in a client terminal become obsolete, or in difficulties in downloading new character fonts necessary for rendering a graphical scene referring to them, on terminals having limited memory, for example mobile communication terminals, telephones, digital television decoders, etc. In addition a terminal with limited memory does not always have the capacity to replace a character font that it is impossible for it to download or that has specific properties that are incompatible with it, with another character font with the closest properties to it and already stored in the terminal.

A method for coupling an unformatted stream of text data to a document presentation device (printer or screen) is also known through the IBM document (EP 0 119 396).

More precisely, the method presented in this document allows the selection of a character font from among a plurality of character fonts defined for various document presentation devices, according to character font identifiers to be used received in the text data stream.

However, the method described in this document is not adapted to manage portions of character fonts in a radio communication terminal.

Finally, the KUWATA et al document (US 2005/080839) describes a system for cataloguing character fonts on a network server and making them available to the computers connected thereto.

However, the system described in this document does not make it possible to manage portions of character fonts in a terminal, nor does it permit the updating of character fonts already catalogued, but supplies a backup catalogue of the character fonts accessible on a network.

SUMMARY

A method of managing character fonts in a radio communication terminal able to receive character fonts in order to render multimedia contents on a screen is provided, which preferably comprises:
- a character font database listing all the fonts or portions of fonts stored by said terminal and associating with each of said fonts at least one management parameter;
- a set of font management commands, said set of commands comprising at least one command applying to a portion of font and belonging to the group comprising at least:
  - a command for transmission of a portion of font with a view to its storage in said terminal;
  - a command for updating a portion of font stored in said terminal;
  - a command for deleting a portion of font stored in said terminal.

According to an embodiment of the invention, such a method advantageously uses in the client terminal, a character font database listing all the fonts or portion of fonts stored by the terminal and associating at least one management parameter with each of the fonts.

Preferably, the set of commands comprises a command ("cacheFont") to transmit a font or a portion of font with a view to its storage in the terminal, which makes it possible in particular to anticipate the use of a new character font at a terminal, by downloading it in the background and transparently for the user, on the terminal.

In a similar and also advantageous fashion, the set of commands comprises a command ("informFont") to update a portion of font stored in the terminal.

Still in a similar fashion, the set of commands comprises a command ("delete") to delete a font or portion of font stored in the terminal.

Advantageously, the set of font management commands is transmitted in a multimedia data stream. This approach makes it possible in particular to integrate in the making of a decision at the terminal to download, delete or replace character fonts already stored in the terminal, management parameters updated and not already known to the terminal.

Such an approach according to an embodiment of the invention, of adding management information to character fonts that are to be used or already stored in a terminal for retrieving graphical scenes, or more generally multimedia scenes, is both novel and inventive, no other technique known at the present time offering this same advantage. This is because, conventionally, as soon as a new multimedia scene is sought by a client terminal from a multimedia scene server terminal, all the character fonts referenced in the description file for said scene are necessarily downloaded, independently of knowing whether these fonts are already stored and therefore available without downloading within the memory of the client terminal.

On the other hand, the method according to an embodiment of the invention offers the advantage of allowing a selective downloading of the character fonts to be used either according to the technical capacities of the radio communication terminal or according to the description properties associated with the character fonts already stored or properly referenced in a new graphical scene.

This information on properties of character fonts defined in the context of the method according to an embodiment of the invention is interpreted by the terminal prior to the rendering of the text objects of a multimedia scene, the terminal consequently choosing to use the same character font already present in its memory, or to substitute, for a font referenced in a multimedia scene to be rendered, another font already present in memory, the character font properties of which are identical to or approach as closely as possible the properties of the character font referenced in said scene to be rendered, or again to proceed with the downloading if necessary of the new character font.

Preferably, the management parameters belong to the group comprising:
  parameters on the type of font, such as its proportionality or not;
  parameters on the length of life of the font, that is to say the time for storing the latter in the memory of the terminal;
  priority parameters, in particular priority of use relative to other character fonts;
  parameters on the characteristics of the font, in particular the memory space that it uses;
  parameters for management of subsets of the font;
  parameters defining conditions for use of the font;
  parameters for management of intellectual property rights associated with the font.

It should be noted advantageously that an embodiment of the invention is careful to respect in particular any copyright that may be associated with specific fonts since it makes it possible to take into account parameters defining the intellectual property of the fonts used and therefore the conditions of use or non-use of the latter without the prior agreement of their respective authors. In this regard, the terminal will be in a position to decide whether it is possible for it to store a character font over a given period or whether on the contrary this font is accompanied by parameters specifying that it may be used but under no circumstances stored or reused in another context, in particular the rendering of one or more multimedia scenes.

Advantageously, the method according to an embodiment of the invention uses a step of managing the memory space occupied by all the character fonts in the terminal, according to how long ago the last use was, the memory volume and/or a priority parameter for each font or portion of font. Such an approach appears to be particularly advantageous for ensuring the storing in memory or the deletion in the latter of character fonts or portions of character fonts where the parameter of length of life in the memory would have a very high value but would occupy a large amount of memory space, which would prevent the downloading or use of certain other character fonts. In other words, if a character font stored in the terminal has a high value for its length of life parameter but would occupy a memory space such that it prevents the downloading of a new character font necessary for the optimal rendering of a multimedia scene, then the character font initially stored may intentionally be deleted from the memory of the terminal in order to be replaced by the new one.

Preferably, the set of commands also comprises at least one command belonging to the group comprising:
  a command to transmit a font with a view to its storage in said terminal;
  a command to update a font stored in said terminal;
  a command to delete a font stored in said terminal.

These various commands in the set of commands allow effective management of the downloadings and/or replacements and/or deletions of a set of character fonts known or not to the terminal, but necessary for optimal rendering of the various multimedia scenes on the latter.

Also preferably, at least one of the commands takes account of at least one of the parameters belonging to the group comprising:
  length of life parameters;
  the name of the font;
  information relating to portions of the font;
  an address at which the font can be downloaded;
  properties of the font.

An embodiment of the invention also concerns a computer program product downloadable from a communication network and/or stored on a carrier where it can be read by computer and/or executable by a microprocessor, and advantageously comprising program code instructions for implementing the aforementioned method of managing character fonts in a terminal.

An embodiment of the invention also concerns a radio communication terminal able to receive character fonts for representing contents on a screen, characterized in that it comprises:
  a database of the character fonts listing all the fonts or portions of fonts stored by said terminal and associating with each of said fonts at least one management parameter;
  means of interpreting a set of font management commands, said set of commands comprising at least one command applying to a portion of font and belonging to the group comprising at least;
  a command to transmit a portion of font with a view to its storage in said terminal;
  a command to update a portion of font stored in said terminal;
  a command to delete a portion of font stored in said terminal.

Preferably, the management parameters associated with at least some of the character fonts managed by such a terminal belong to the group comprising:

parameters on the type of font, such as its proportionality or not;

parameters on the length of life of the font, that is to say the time kept in the terminal;

priority parameters, with respect to other fonts;

parameters on the characteristics of the font, in particular the memory space that it uses;

parameters for management of subsets of the font;

parameters for management of intellectual property rights associated with the font;

parameters defining conditions of use.

Preferably, such a terminal according to an embodiment of the invention advantageously comprises means of managing the memory space occupied by all the character fonts in the terminal, in particular in the memory thereof, according to how long ago the last use was, the size and/or a priority parameter for each font or portion of font.

Also advantageously, the set of font management commands is transmitted in a multimedia data stream and also comprises at least one command belonging to the group comprising:

a command to transmit a font with a view to its storage in said terminal;

a command to update a font stored in said terminal;

a command to delete a font stored in said terminal.

BRIEF DESCRIPTION OF THE DRAWINGS

Other characteristics and advantages will emerge more clearly from a reading of the following description of a preferential embodiment, given by way of simple illustrative and non-limiting example, of FIG. 1 illustrating the general principle of management of character fonts within a mobile radio communication terminal according to an embodiment of the invention, in the context of an example of modification of a graphical scene comprising text objects.

DETAILED DESCRIPTION OF ILLUSTRATIVE EMBODIMENTS

Figure 1:
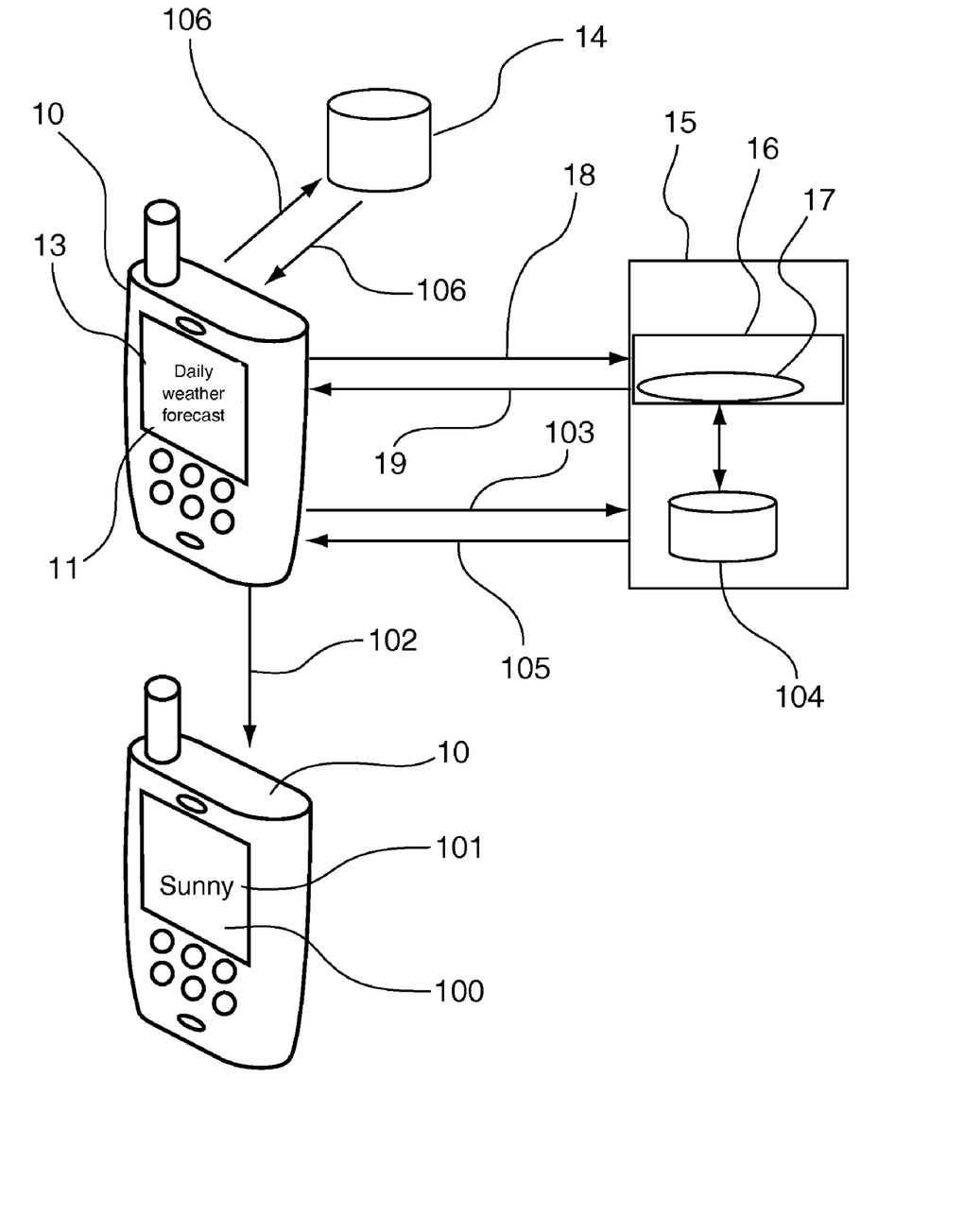

In the example in FIG. 1, the user of a mobile telephone (10) wishes to consult a service giving him the weather forecast for the day. For reasons of simplification of the example, the multimedia scene (11) for access to this weather service is here intentionally made very succinct and comprises a interactive text object (13) in the form of click-on text object "daily weather forecast", represented on the screen by means of a character font available in the memory (14) of the terminal (10).

The user selects the "daily weather forecast" link, which causes the sending of a request (18) by the terminal (10) to a multimedia content server terminal (15) hosting the file (16) describing the multimedia scene of the "daily weather forecast" service. This description file contains, for all its text objects, data (17) describing the character fonts by means of which they are to be rendered on the terminal (10), for example consistent with a graphics chart defined by the authors of the weather service.

In response to the request (18) of the client terminal, the server terminal (15) returns a bit stream (19) containing the file (16) describing the scene corresponding to the "daily weather forecast" and the information data (17) relating to the character font that are to be used by the terminal.

As soon as the stream (19) is received, the terminal (10) interprets the data (17) describing the character fonts to be used.

Firstly, it looks (106) in its character font database (14), to see whether the description data (17) correspond to a character font already stored, or if not, whether a font already stored has properties similar or identical to those (17) described in the stream (19). If that is the case, then the terminal (10) will not download the fonts described in the file (16) describing the multimedia scene describing the daily weather forecast, but will display (102) the new scene (100) displaying the text object (101) "Sunny" using the identical character font available in memory, or a substitute character font with identical or similar properties.

In the contrary case, the terminal (10) will send a request (103) for downloading the font required for displaying the object "Sunny", this being available for example from a character font database (104) hosted by the content server terminal (15), or at an address defined in the attribute "URL" of the data (17) describing the character font to be used.

The content server terminal (15) then returns (105) the character font to the client terminal (10). The latter will then store this new character font in its memory or character font database (14), after having released the memory space necessary for this storage.

Once the new character font is placed in memory (14), the display (102) of the new scene (100) displaying the text object "Sunny" is rendered with the correct character font.

Description of an Embodiment of the Invention

An embodiment of the present invention therefore concerns a technique for managing character fonts in a radio communication terminal, able to receive character fonts in order to represent multimedia contents on a screen.

The object of an embodiment of the invention consists of describing a process of transmitting and decoding character font management functions.

Numerous graphical scenes or more generally multimedia scenes must in effect be able to manage, at the terminal, for their rendering as initially defined by their author, a character font base, associated with text objects of the scene.

Such a management is accompanied in particular by the use of functions of storage, destruction, validity expiry management or putting these fonts in cache memory, or functions of modifying all or some of these, and therefore more generally functions of description of character font management making it possible to manage the storage, transmission and re-use of several character fonts within a set of graphical scenes.

Such a technical approach of "low level" representation of the functions of character font "management" at terminals, for example radio communication terminals, is both novel and inventive in that it makes it possible firstly to obtain a relatively refined interaction between the multimedia scenes that are to be rendered on a terminal and the associated character fonts and secondly in that it makes it possible to effect a binary transportation of the character fonts or of certain previously selected parts of these between a contents server transmitting a graphical scene containing specific character fonts and the terminal that receives them. Such an approach also advantageously makes it possible to reduce the latency time for the final user when the graphical scenes are rendered and/or the character fonts necessary for this are downloaded.

An embodiment of the invention applies to a large number of applications that require a representation of the signals that make it up in the form of a spatio-temporal arrangement of graphical objects, in contexts like the one described below.

A client terminal, for example a radio communication terminal, seeks from a multimedia content server terminal (for example a graphical scene server) a graphical animation content.

The multimedia content server terminal returns the content sought to the client terminal, which loads in its description the spatio-temporal arrangement of the graphical objects.

In this content transmitted by the server terminal to the client terminal, character font management functions are described in relation to the text objects loaded in the description file of a graphical scene. They indicate in particular that a set of fonts will be stored in memory in the receiver and that it will have to remain accessible (or not) in response to a request from the same client terminal.

When a font is necessary, the value of the font is read and used within the client terminal.

It should be noted that this very general technique can apply to practically all descriptions of graphical animations currently existing:
- MPEG-4-BIFS ("Binary Format Scene");
- the SVG language, or "Scalable Vector Graphics";
- the SMIL language, or "Synchronized Multimedia Integration Language", the purpose of which consists of allowing the integration of multimedia elements in a Web page;
- the XML event module, the purpose of which consists of allowing a uniform integration of event listeners and event managers associated with the event interfaces of an object document model in the DOM format ("Document Object Model");
- HTML, etc.

The method according to an embodiment of the invention also makes it possible to manage the memory space occupied by all the character fonts that are used by the graphical rendering engine of the graphical scenes, within the client terminal, so that, when the character font becomes obsolete in this set, vis-à-vis the rendered graphical and multimedia scenes, it is eliminated from the current set of character fonts stored, and possibly replaced by all or part of a more current character font, or one required for the rendering of a new graphical scene.

The method according to an embodiment of the invention also makes it possible to manage the temporary backup of character fonts and to take account of this backing up when a graphical scene is rendered, so as to avoid a new downloading of the character font if this already appears in the set of character fonts available on the terminal in question, which also favors a reduction in the latency time that the user can sometimes find when a graphical scene is rendered on his terminal.

It also makes it possible to manage the enhancement and updating of a sub-set of character fonts within a graphical scene, or the replacement of a font or sub-sets of a font in a constrained terminal.

More precisely, in the context of the character font management method according to an embodiment of the invention, a set of commands is used to modify a set of properties of graphical objects using text in a scene at a given moment.

The commands that must be executed simultaneously are grouped together in the same data packet when the scene description file is transmitted, for example by means of an "AccessUnit" command in MPEG-4/Systems which fits in the context of a scene replacement command "SceneReplace", or in a RTP, "Real-time Transfer Protocol" packet.

Such commands are transmitted when necessary by the content server to the client terminal, which will interpret them. They are of different types.

A first command "cacheFont" makes it possible to send in advance, in relation to a rendering of a graphical scene, a character font that will then be available in the memory of the client terminal as soon as a request for such a font is made by the terminal. This is an approach by anticipation in which a character font is put in the cache memory of the terminal, with a view to a subsequent request for use.

This request can be made either by a user interaction or in the context of a rendering of text using this font at the time of rendering of a graphical scene.

As illustrated below the command "cacheFont" can be directly loaded in the description file of a scene, in the following fashion;

```
<Scene>
[ . . . ]
<Insert>
<Transform>
<Audio    DEF="Local:    scene.new_sound.rendering"
   startTime="NOW"    streamID="4"    trackID="4"
   source="velo_default$2.3gp"/>
<Transform>
</Insert>
<cacheFont                                          TTL='2
   months'FontName='title_font'FontSubSetID='0'URL-
   'http://serverfont.stz.com/title_font'>
<Data>"specifies supplementary information data concerning the font"
<Data>
<Properties>
<param name="closetoFontName" value=Arial"/>
<param name="priority" value="High"/>
<param name="vendor" value="Adomedia"/>
<Properties>
</cacheFont>
[ . . . ]
```

A command "cacheFont" can thus be executed by the client terminal at any time in order to store a given character font. This command is accompanied by a certain number of parameters, such as the expiry date of the keeping of the font in memory following the execution of this command, defined according to the moment of receipt of the font and the length of life thereof in memory beyond which the font in question is automatically deleted.

As specified above, among the various attributes of the command "cacheFont" defined in the context of an embodiment of the invention, there can be cited:
- "TTL": the duration of validity in memory of a character font benefiting from the command "cacheFont";
- "FontName": the unique name of the character font enabling the latter to be identified among the various fonts available at a given time within a terminal;
- "FontSubSetID": this attribute specifies the subset of the font identified by the attribute "FontName";
- "URL": the place from which the data of the font can be recovered;
- "Properties": the list of parameters expressing properties of the font, for example the language associated with the font;
- "Data": supplementary information data concerning the font.

Following the execution of a command "cacheFont", it may happen that the character font in question cannot be stored in the memory of the client terminal when the latter is already full or the memory space remaining available on the terminal for storing this new font is insufficient.

Consequently and in a first scenario, the client terminal will then use the parameter "URL" of the command in order to subsequently go and search for this character font at the address specified by this parameter, provided that the rendering of a graphical or multimedia scene so requires.

In a second scenario, if this parameter "URL", or the parameter "data", are not given in the command "cacheFont", the client terminal will then interpret the fact that the character font is not available for subsequent downloading and therefore that it is necessary for it to take account of the attribute "properties" in order to determine the character font possessing the properties closest to the identifier font associated with the command "cacheFont" and to substitute it for the latter when a scene is rendered.

A second command "informFont" updates all or some of the information relating to a font already stored in the client terminal.

Such a command can also be used for indicating that a character font already present in the memory of the client terminal already satisfies the properties listed in the attribute "Properties" that may accompany it, which enables the author of graphical or multimedia scenes to more simply manage the substitution of character fonts within a scene that is to be rendered on a radio communication terminal, at a given time.

Among the attributes of the update command, there are also defined:
 "TTL": the period of validity in memory of the character font in cache memory that is to benefit from an updating;
 "FontName": the unique name of the character font that is to benefit from an updating;
 "FontSubSetID": this attribute specifies the subset of the font identified by the attribute "FontName";
 "URL": the place from which the data of the font can be recovered;
 "Properties": the list of parameters expressing properties of the font, for example the language associated with the font;
 "Data": supplementary information data concerning the font.

A third deletion command "Delete" deletes the memory area identified by the attributes "FontName" and "FontSubSetID" of a character font stored within a client terminal, which has the effect of making the character font thus deleted inaccessible without downloading it anew and therefore releasing corresponding memory space at the terminal.

These various character font management commands defined in the context of the method according to an embodiment of the invention are used by the radio communication terminal for managing character fonts preliminary to or during the rendering of a graphical or multimedia scene.

Thus, initially, the terminal recovers from a content server terminal, by means of a network connection, data describing one or more graphical scenes that it must render.

These data are then decompressed in order to obtain a description of the graphical objects directly usable by the audio and graphical rendering engine of the terminal, the latter being responsible for the composition of the graphical objects with each other in order to create a graphical scene corresponding to the description data.

During the composition phase for the various objects in the graphical scene, the terminal interprets the font management commands that accompany them, before proceeding with the display of the various text objects included in the scene, either with a new font or a using a substitute font with close or identical properties already present in the memory of the terminal.

The interactions of the user on the graphical or multimedia scene thus rendered are then taken into account (manipulation of a pointer, pressing a physical or software key, etc.).

As the user gradually interacts with a scene, graphical modifications requiring establishment of a network connection to a local or distant information source may be initiated, including the allocation or use of a new character font for the display of a specific text for example.

Thus, following a request from the user, the computer program product executing the method according to an embodiment of the invention will initiate a network connection to a content server terminal so as to retrieve a bit stream that is to be analyzed then by the multimedia reader of the client terminal, so as to create or modify a graphical scene containing text elements to be rendered according to a predetermined character font and in accordance with the character font management commands contained in the bit stream.

The advantage of the management method according to an embodiment of the invention can therefore be summarized in four main points:
 reduction of the memory space used since only the set of fonts pertinent for rendering graphical scenes is placed in memory in the terminal;
 a saving in the use of processing resources through the use of a character font management method in accordance with the graphical command rendering process that favors its relatively simple installation on a radio communication terminal having available often limited memory and processing capacity, for example a mobile telephone;
 compatibility with the conventional graphical or multimedia scene decoding techniques, through its possibility of integration in the majority of graphical rendering devices;
 gain in expressiveness in the context of the creation of graphical or multimedia contents, through the use of a technique that may be directly integrated in the graphical command rendering process and promoting high dependency between the graphical or multimedia content to be rendered and the use of the character fonts referenced within this content.

An aspect of the disclosure provides a character font management technique in a radio communication terminal that takes account of the properties of a character font in order to determine whether the latter must or simply may be used by a terminal, of the radio communication terminal type in particular, for rendering a multimedia scene referring to it.

Another aspect of the disclosure provides such a character font management technique allowing a selective downloading of character fonts or portions of character font, relating to the requirements for renderings of a graphical or more generally multimedia scene.

An additional aspect of the disclosure provides such a technique that promotes optimal and dynamic management of the character fonts that are to be used at a terminal, for rendering of multimedia scenes.

Another aspect of the disclosure provides such a technique making it possible to store in the memory of a terminal only all the fonts that are pertinent for the rendering of graphical scenes.

An additional aspect of the disclosure proposes such a technique that is perfectly compatible with the conventional techniques of decoding character fonts, that is to say able to be easily integrated in the majority of graphical rendering devices equipping the terminals able to render graphical scenes.

Yet another aspect of the disclosure provides such a character font management technique that can be perfectly integrated in the device for the rendering of graphical commands of a multimedia scene (a multimedia software reader for example) and that allows high dependency between a graphical content to be rendered and the associated character fonts.

Another aspect of the disclosure aims at providing such a technique that is relatively simple to implement and use, while remaining of reasonable cost in terms of installation and/or use.

Although the present disclosure has been described with reference to one or more examples, workers skilled in the art will recognize that changes may be made in form and detail without departing from the scope of the disclosure and/or the appended claims.

The invention claimed is:

1. A method comprising:
   receiving a description file of a multimedia scene at a radio communication terminal;
   identifying within the description file of the multimedia scene each of a first font management command referencing a first character font to be used for rendering a first portion of the multimedia scene and a second font management command referencing a second character font to be used for rendering a second portion of the multimedia scene;
   identifying from the first font management command first parameters associated with the first character font including:
      a parameter indicating an address where the first character font can he downloaded, and
      a parameter for management of an intellectual property right associated with the first character font;
   identifying from the second font management command a second parameter associated with the second character font including properties of the second character font;
   searching for the first character font at the indicated address, and downloading the first character font from the indicated address;
   rendering, on the radio communication terminal, the first portion of the multimedia scene using the first character font;
   after rendering the first character font within the multimedia scene, preventing further storage of the first character font based on the intellectual property right associated with the first character font, such that further use of the downloaded first character font by the radio communication terminal within another multimedia scene is prevented;
   determining based on the identified second parameter that no address was provided in the second font management command for downloading the second character font;
   in response to the determination that no address was provided for downloading the second character font, identifying a substitute character font from at least one other character font already stored in the radio communication terminal by determining that the properties of the second character font match properties of the substitute character font more closely than properties of remaining ones of the at least one other character font already stored in the radio communication terminal; and
   rendering, on the radio communication terminal, the second portion of the multimedia scene using the substitute character font;
   wherein if a particular font of the at least one other character font already stored in the radio communication terminal has a value for a length of life parameter indicating that the particular font is to remain in memory of the radio communication terminal, but the particular font occupies a particular portion of the memory such that the particular font prevents the downloading of the first character font from the indicated address, then the particular font is deleted from the particular portion of the memory of the radio communication terminal in order to be replaced by the first character font.

2. The method according to claim 1, further comprising managing memory space occupied by the at least one other character font already stored in the radio communication terminal, according to one or more of the following:
   how long ago a last use was,
   a memory volume, and
   a priority parameter for each of the at least one other character font.

3. A computer program product stored on a non-transitory media that can be read by a computer, comprising:
   computer code for receiving a description file of a multimedia scene at a radio communication terminal;
   computer code for identifying within the description file the multimedia scene each of a first font management command referencing a first character font to be used for rendering a first portion of the multimedia scene and a second font management command referencing a second character font to be used for rendering a second portion of the multimedia scene;
   computer code for identifying from the first font management command first parameters associated with the first character font including:
      a parameter indicating an address where the first character font can be downloaded, and
      a parameter for management of an intellectual property right associated with the first character font;
   computer code for identifying from the second font management command a second parameter associated with the second character font including properties of the second character font;
   computer code for searching for the first character font at the indicated address, and downloading the first character font from the indicated address;
   computer code for rendering, on the radio communication terminal, the first portion of the multimedia scene using the first character font;
   computer code for, after rendering the first character font within the multimedia scene, preventing further storage of the first character font based on the intellectual property right associated with the first character font, such that further use of the downloaded first character font by the radio communication terminal within another multimedia scene is prevented;
   computer code for determining based on the identified second parameter that no address was provided in the second font management command for downloading the second character font;
   computer code for, in response to the determination that no address was provided for downloading the second character font, identifying a substitute character font from at least one other character font already stored in the radio communication terminal by determining that the properties of the second character font match properties of the substitute character font more closely than properties of remaining ones of the at least one other character font already stored in the radio communication terminal; and computer code for rendering, on the radio communication terminal, the second portion of the multimedia scene using the substitute character;

wherein the computer program product is operable such that if a particular font of the at least one other character font already stored in the radio communication terminal has a value for a length of life parameter indicating that the particular font is to remain in memory of the radio communication terminal, but the particular font occupies a particular portion of the memory such that the particular font prevents the downloading of the first character font from the indicated address, then the particular font is deleted from the particular potion of the memory of the radio communication terminal in order to be replaced by the first character font.

4. A radio communication terminal, comprising:

a microprocessor for:

receiving a description file of a multimedia scene at the radio communication terminal;

identifying within the description file of the multimedia scene each of a first font managementt command referencing a first character font to be used for rendering a first portion of the multimedia scene and a second font management command referencing a second character font to be used for rendering a second portion of the multimedia scene;

identifying from the first font management command first parameters associated with the first character font including:

a parameter indicating an address where the first character font can be downloaded, and a parameter for management of an intellectual property right associated with the first character font;

identifying from the second font management command a second parameter associated with the second character font including properties of the second character font;

searching for the first character font at the indicated address, and downloading the first character font from the indicated address;

rendering, on the radio communication terminal, the first portion of the multimedia scene using the first character font;

after rendering the first character font within the multimedia scene, preventing further storage of the first character font based on the intellectual property right associated with the first character font, such that further use of the downloaded first character font by the radio communication terminal within another multimedia scene is prevented;

determining based on the identified second parameter that no address was provided in the second font management command for downloading the second character font;

in response to the determination that no address was provided for downloading the second character font, identifying a substitute character font from at least one other character font already stored in the radio communication terminal by determining that the properties of the second character font match properties of the substitute character font more closely than properties of remaining ones of the at least one other character font already stored in the radio communication terminal; and rendering, on the radio communication terminal, the second portion of the multimedia scene using the substitute character font;

wherein said radio communication terminal is operable such that if a particular font of the at least one other character font already stored in the radio communication terminal has a value for a length of life parameter indicating that the particular font is to remain in memory of the radio communication terminal, but the particular font occupies a particular portion of the memory such that the particular font prevents the downloading of the first character font from the indicated address, then the particular font is deleted from the particular portion of the memory of the radio communication terminal in order to be replaced by the first character font.

5. The radio communication terminal according to claim 4, wherein the radio communication terminal is operable such that a memory space occupied by the at least one other character font already stored in the radio communication terminal is managed according to one or more of the following:

how long ago a last use was, a size, and a priority parameter for each of the at least one other character font.

6. The method of claim 1, wherein each of the at least one other character font already stored in the radio communication terminal was search for at, and downloaded from, a server address identified in a respective font management command.

7. The method of claim 1, wherein a language of the substitute character font and a language of the second character font are utilized for determining that the properties of the second character font match the properties of the substitute character font more closely than the properties of the remaining ones of the at least one other character font already stored in the radio communication terminal.

8. The method of claim 1, further including receiving an update command at the radio communication terminal to update the substitute character font already stored in the radio communication terminal, the update command including a third parameter associated with the substitute character font and including additional properties satisfied by the substitute character font, such that, upon updating the properties of the substitute character font with the additional properties of the substitute character font, the substitute character font is operable for use as a substitute for at least one additional character font on the radio communication terminal.

9. The method of claim 1, further including receiving a delete command at the radio communication terminal to delete a second portion of the memory of the radio communication terminal, wherein the second portion of the memory is specified in the delete command by two parameters associated with a specific one of the at least one other character font already stored in the radio communication terminal.

* * * * *

UNITED STATES PATENT AND TRADEMARK OFFICE
CERTIFICATE OF CORRECTION

PATENT NO. : 8,381,115 B2  
APPLICATION NO. : 12/092483  
DATED : February 19, 2013  
INVENTOR(S) : Julien Tranchant et al.

Page 1 of 1

It is certified that error appears in the above-identified patent and that said Letters Patent is hereby corrected as shown below:

In the Claims:
At column 11, claim number 1, line number 34; please replace "he" with --be--;
At column 12, claim number 3, line number 24-25; please replace "file the" with --file of the--;
At column 13, claim number 4, line number 21; please replace "managementt" with --management--.

Signed and Sealed this
Twelfth Day of April, 2016

Michelle K. Lee
*Director of the United States Patent and Trademark Office*